United States Patent [19]
Jones, Jr. et al.

[11] 3,881,207
[45] May 6, 1975

[54] LOADING DOCK

[76] Inventors: Paul Jones, Jr., 4347 Moon Light Dr.; Ferris E. Jones, 4323 Moon Light Dr., both of Holly, Mich. 48442

[22] Filed: Oct. 10, 1973

[21] Appl. No.: 405,159

[52] U.S. Cl. .................................................. 14/72
[51] Int. Cl. ............................................. B65g 11/00
[58] Field of Search ....... 14/71, 72; 214/47; 403/85, 403/107; 248/456

[56] References Cited
UNITED STATES PATENTS

| | | | |
|---|---|---|---|
| 2,502,181 | 3/1950 | Stacey | 14/71 X |
| 3,334,368 | 8/1967 | McIntosh | 14/71 |
| 3,628,209 | 12/1971 | Parent | 14/71 |
| 3,671,990 | 6/1972 | Hovestad | 14/71 |
| 3,699,601 | 10/1972 | Hecker et al. | 14/71 |

*Primary Examiner*—Roy D. Frazier
*Assistant Examiner*—Robert W. Gibson, Jr.
*Attorney, Agent, or Firm*—Arnold S. Weintraub

[57] ABSTRACT

A loading dock for facilitating the transport of articles from piers to haulaway vehicles or the like includes a pair of spaced apart ramps rotatably secured to a base at one end thereof. Co-acting means disposed on the lateral exterior side of the dock enables the ramps to be locked in any position between the horizontal and vertical. The present loading dock is particularly adapted for loading automotive vehicles onto trailers therefor.

8 Claims, 6 Drawing Figures

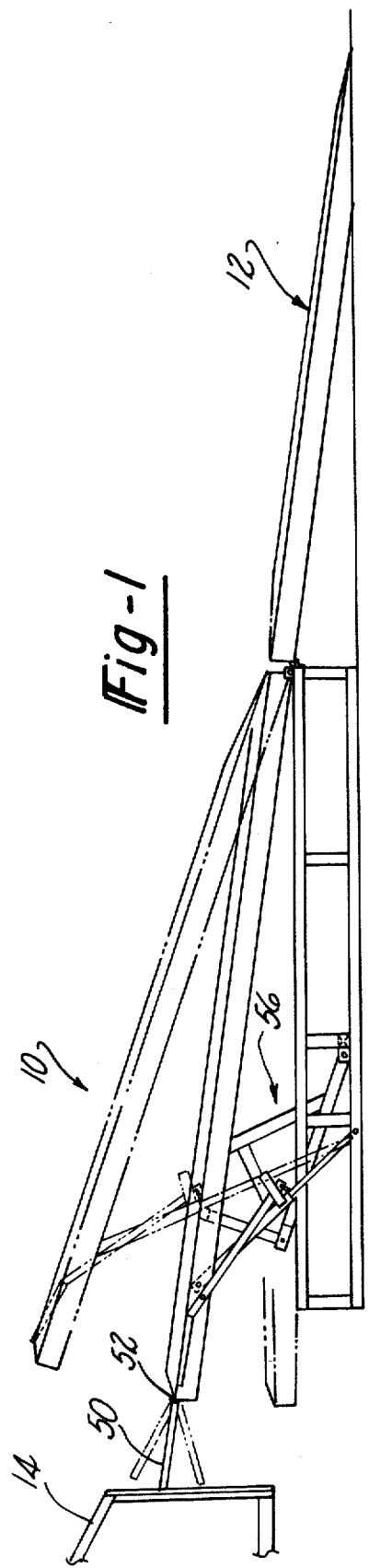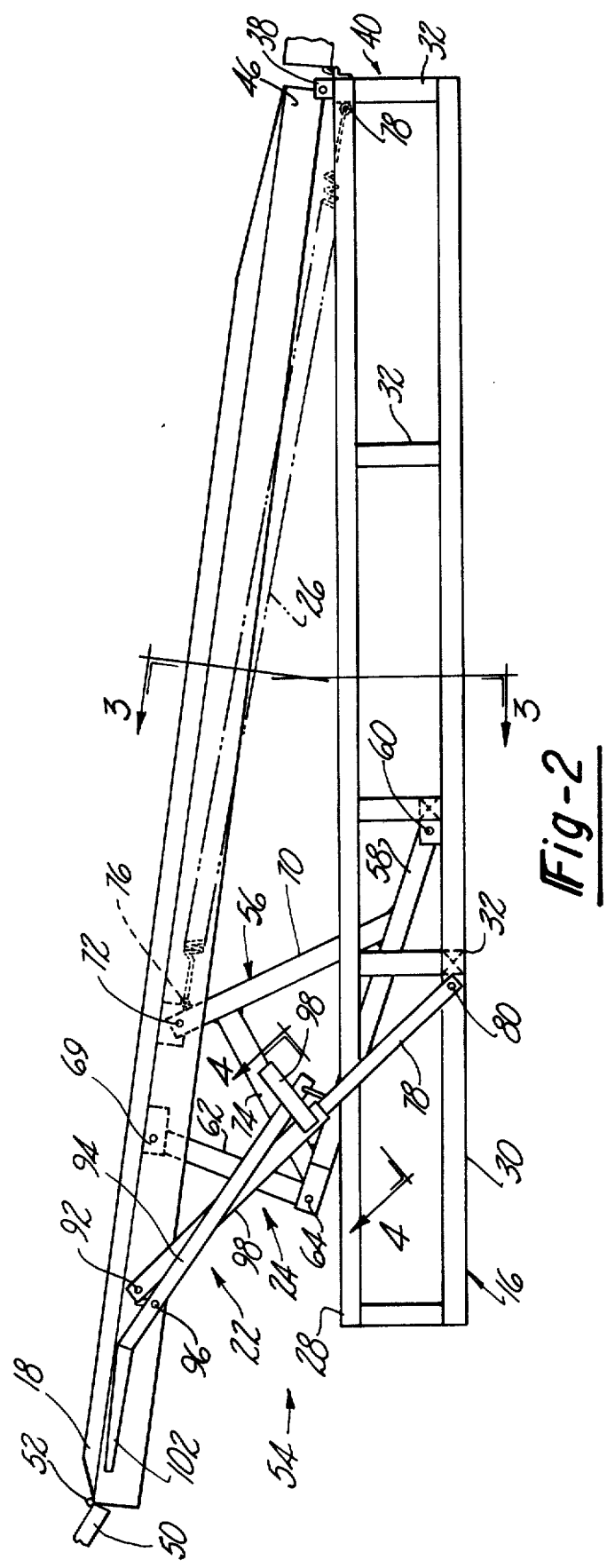

LOADING DOCK

BACKGROUND OF THE INVENTION

1. Field of the Invention

The present invention pertains to loading docks and in particular to loading docks for facilitating the loading and unloading of automobiles from trailers and the like therefor.

2. Prior Art

The use of "portable" loading docks to facilitate the loading and unloading of vehicles from carriers, such as, has been known. Generally, the docks are interposed between a ground surface, such as a pier, earth or the like, and a carrier from which a plurality of vehicles, such as, automobiles, van trucks and the like, are loaded or unloaded.

In order to effectively deploy the loading docks the height of the ramps must be adjusted. Heretofore, height adjustment required the operator to go into the interior of the dock to make the necessary manual adjustments. In other words, the dock operator was required to make the adjustment underneath the ramps. This inherently creates a safety hazard. If the locking mechanism for the ramps fail, collapse of the ramps occurs thereby causing grievious injury to the operator.

The prior art has failed to provide reasonable solutions to alleviate this problem. Prior remedies still create the possiblity of causing grave injury to the operator's limbs. Thus, a major advancement in the art would be provided by a reliable adjustable loading dock which displaces the operator from the confines of the dock when adjusting same.

SUMMARY OF THE INVENTION

In accordance with the present invention there is provided an adjustable loading dock which eliminates the heretofore described hazards.

The present loading dock includes a base structure having a pair of spaced apart ramps rotatably mounted thereon at one end thereof.

The present loading dock further includes a pair of co-acting locking means disposed on the lateral exterior sides of the dock and which extends between the ramps and the base.

A rotational yoke centrally disposed within the dock pivotally connects the ramps to the base. Tensioning means are further provided between the yoke and the base of the dock.

By actuating either of the locking means the ramps are rendered adjustable between a substantially horizontal position and a substantially vertical position.

For a more complete understanding of the present invention reference is made to the following detailed description and accompanying drawing. In the drawing like reference characters refer to like parts throughout the several views in which:

BRIEF DESCRIPTION OF THE DRAWING

FIG. 1 is a side elevational view of the dock of the present invention shown in conjunction with a carrier and a pier;

FIG. 2 is a side elevational view of the loading dock of the present invention;

DESCRIPTION OF THE PREFERRED EMBODIMENTS

Figure 3:
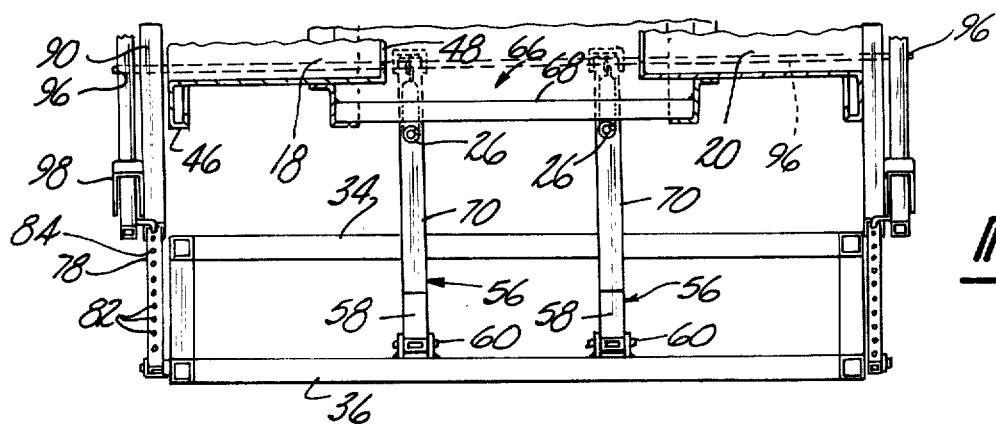
FIG. 3 is a cross-sectional view of the loading dock taken along the line 3–3 of FIG. 2.
Figure 4:
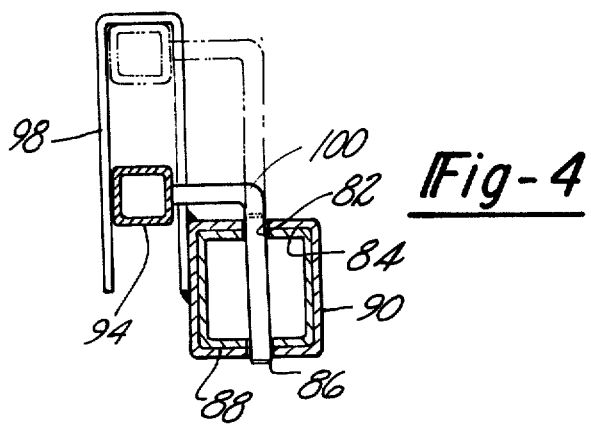
FIG. 4 is a cross-sectional view of the locking means hereof taken along the line 4—4 of FIG. 2.

Now with reference to the drawing, and in particular FIGS. 1 and 2, there is depicted a loading dock, generally indicated at 10, interposed between a pier 12 and a carrier 14. As used herein the term "carrier" refers to any suitable transport device for vehicles, such as, automobiles, van trucks and the like. Thus, a carrier can include a trailer, railroad car or the like.

The loading dock 10 hereof facilitates the loading of vehicles onto the carrier from the pier or unloading of vehicles from the carrier 14 to the pier 12. It is to be understood, however, that the carrier and the pier do not constitute part of the instant invention apart from the conjoint use thereof with the present loading dock.

The loading dock 10 hereof generally comprises a base or base structure 16 and a pair of spaced apart ramps 18, 20. The dock 10 further includes a pair of similar co-acting locking means, generally indicated at 22, which extends between the ramps 18, 20, respectively, and the base 16. A yoke 24 is pivotally mounted between the base 16 and the ramps 18, 20. Tensioning means 26 extends between the base 16 and the yoke 24.

With more particularity, and with reference to FIGS. 2-5, the base 16 comprises a substantially rectangular framing structure having a top wall 28 and a bottom wall 30. A plurality of spaced apart upright struts 32 extend between the top and bottom wall to provide structural integrity to the base. A plurality of horizontal cross struts 34 and 36 are also, provided and which extend between the sides of the top wall 28 and bottom wall 30, respectively. The struts as well as the walls are interconnected by any suitable means, such as by welding or the like. It should be noted that the members comprising the base 16 are, preferably, formed from rectangular steel tubing which imparts sufficient strength to the system to withstand the forces exerted thereon.

Figure 5:
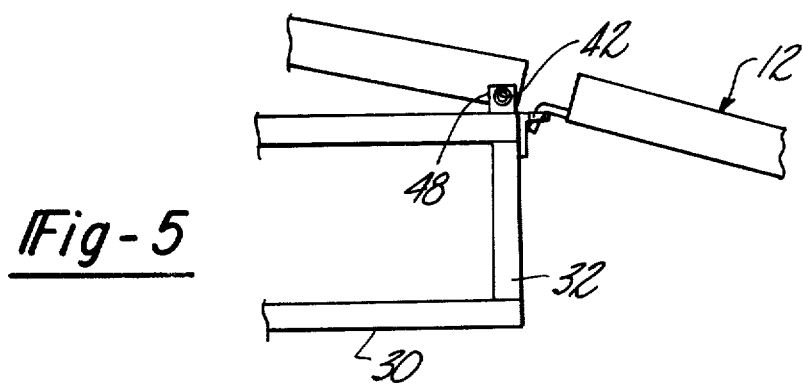
FIG. 5 is a partial side elevational view of the frontal portion of the loading dock of the present invention.
Figure 6:
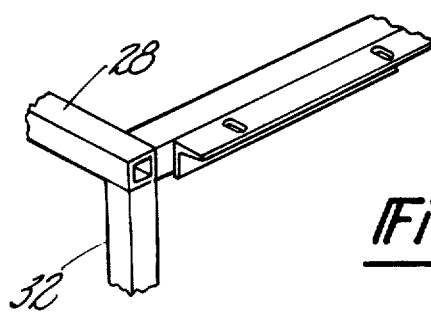
FIG. 6 is a partial perspective view of the frontal portion of the loading dock of the present invention.

The ramps 18, 20 are rotatably or pivotally mounted as at 38, to the top of the base 16 at a first end 40 of the dock 10, as shown. The ramps are pivotally mounted by any suitable means to the base. For example, and as shown in FIG. 5, a pin or rod 42 extends through the sidewalls 44, 46 of the ramps and are secured to the base through a collar 48, in a well known manner.

The ramps 18, 20 hereof comprise any suitable ramp of the well known type. Each of the ramps has a jumper section 50 pivotally connected thereto, as at 52, at the end 54 of the dock 10 opposite the end 40. The jumper section traverses any space between the end 54 of the dock 10 and the entrance to the carrier 14.

The pivot 38 associated with each of the ramps 18, 20 enables the ramps to be rotatably positioned between a substantially horizontal position and a substantially vertical positon, as shown in FIG. 1.

Still referring to FIGS. 2-5, a yoke 24 is provided substantially centrally of the loading dock 10. The yoke 24 interconnects the ramps 18, 20 and the base 16. The yoke 24 comprises a first frame member 58 pivotally affixed to a cross strut 36, as at 60 at a first end thereof. A second frame member 62 extends perpendicular to the first frame member 58 and has a first end pivotally connected thereto at the opposite end thereof, as at 64. The second or opposite end of the second frame member is rigidly affixed to ramp connecting means 66, such as a cross strut 68, as at 69.

The cross strut 68 is rigidly affixed to the ramps 18, 20 and transverses the space therebetween.

The yoke 24 further includes a third frame member 70 which is inclined with respect to the plane defined by the first and second frame members, 58 and 62, respectively. The inclined frame member 70 is rigidly affixed to the frame member 58 at one end thereof and is pivotally connected to the cross strut 68 at its other end, as at 72.

A reinforcement member 74 extends substantially perpendicular to inclined frame member 70 and is affixed thereto at one end thereof. The other end of the member 74 is affixed to frame member 58 proximate its junction with frame member 62.

As shown in FIG. 2, proximate the pivot point 72 associated with frame member 70 there is provided attachment means, such as a hook 76. The attachment means receives a first terminus of tensioning means 26. The other end of the tensioning means is connected to attachment means 78 which, in turn, is secured to the base 16, as shown.

It is to be understood that the preceding description of the yoke 24 and tensioning means 26 describes only a first half thereof associated with the ramp 18. Thus, the yoke, in its totality comprises two such halves interconnected through cross struts such that their movement is simultaneous and contemporaneous.

It is to be appreciated that as the ramps are rotated, the yoke 24 reacts and pivotally rotates along with the ramps. The tensioning means facilitates the motion of the ramps and the yoke.

As hereinbefore noted, the present invention further includes locking means 22. The locking means 22 permits and allows the ramps and yoke to be adjustably rotated while securely locking the ramps at any desired position. The locking means 22 comprises a tubular member 78 which is pivotally mounted to the base 16 at the lower end 30, as at 80. The tubular member 78 includes a plurality of apertures 82 disposed therealong on the top surface 84 thereof. The apertures 82 are in registry with corresponding apertures 86 disposed along the bottom surface 88 of the tubular member 78.

The tubular member 78 telescopes within an extended collar 90. The extended collar is pivotally secured to the side 46 of the ramp 18, as at 92.

The locking means 22 further includes a lever 94 which is secured to the side 46 of ramp 18. The point of securement of the lever comprises a rigid bar 96 which traverses the width of the dock 10 and which is secured to a similar lever at its other end. Thus, as the lever 94 is rotated, its complementary lever is similarly moved.

The lever 94 is guided in its movement by an upstanding channel 98 which is secured to the extended collar 90 proximate its lower end.

The locking means 22 further includes a locking pin 100 which is rigidly secured to the lever arm 96 at its lower end. The locking pin 100 is adapted to be insertable through any pair of registered apertures 82, 86 disposed along the tubular member 78 upon the rotation of the lever. Because of the rigid connection between the pin and the arm, any rotation of the arm causes similar movement of the pin.

Because each ramp has similarly configured and interconnected locking means it is apparent that as one locking pin is inserted into registering apertures the same effect occurs with the other locking pin. Thus, there is simultaneous locking as well as release from locking occurring with both ramps.

In order to facilitate movement of the lever 98, a handle 102 is integrally formed or associated therewith.

It is apparent from the preceding that the instant loading dock is completely safe in that the operator or user thereof remains completely outside the confines thereof.

Having thus described the invention, what is claimed is:

1. A loading dock comprising:
   a. a base structure,
   b. a pair of spaced apart ramps pivotally mounted on the base structure for rotation between a substantially horizontal position and a substantially vertical position,
   c. locking means associated with each of the ramps for positioning the ramps, the locking means being interconnected such that the locking means are simultaneously moveable to position the ramps anywhere between the horizontal and vertical position, each of the locking means comprising:
      1 a tubular member pivotally connected to the base structure and having a plurality of apertures disposed therealong,
      2 an extended collar pivotally connected to the ramp,
      3 a locking pin insertable through the apertures, and wherein the tubular member telescopes within the extended collar.

2. The loading dock of claim 1 which further comprises:
   a. a yoke pivotally connected between the base structure and the ramps,
   b. tensioning means extending between the base structure and the yoke,
   c. the yoke and the tensioning means cooperating to facilitate the movement of the ramps.

3. The loading dock of claim 1 wherein the locking means further includes:
   a lever arm rotatably connected to the ramp, and wherein the locking pin is rigidly connected to the lever arm.

4. The loading dock of claim 1 wherein the locking means are interconnectable through a rigid bar traversing the width of the dock.

5. The loading dock of claim 4 wherein each end of the rigid bar is secured to an associated lever arm.

6. The loading dock of claim 1 wherein the locking means for each of the ramps are interconnected by a rigid bar traversing the width of the dock.

7. The loading dock of claim 6 wherein each end of the rigid bar is secured to an associated lever arm.

8. A loading dock comprising:
   a. a base structure,
   b. a pair of spaced apart ramps pivotally mounted on the base structure for rotation between a substantially horizontal position and a substantially vertical position, c. locking means associated with each of the ramps for positioning the ramps, the locking means being interconnected such that the locking means are simultaneously moveable to position the ramps anywhere between the horizontal and vertical positions, each of the locking means comprising:
1. a tubular member pivotally connected to the base structure and having a plurality of apertures disposed therealong,
2. an extended collar pivotally connected to the ramp,
3. a locking pin insertable through the apertures,
4. a lever arm rotatably connected to the ramp, and wherein the locking pin is rigidly secured to the lever arm and the tubular member telescopes within the extended collar.

* * * * *